(12) United States Patent  
Roye

(10) Patent No.: US 12,528,422 B2
(45) Date of Patent: Jan. 20, 2026

(54) MOUNT ASSEMBLY FOR A WATERCRAFT

(71) Applicant: James Roye, Altamont, TN (US)

(72) Inventor: James Roye, Altamont, TN (US)

( * ) Notice: Subject to any disclaimer, the term of this patent is extended or adjusted under 35 U.S.C. 154(b) by 103 days.

(21) Appl. No.: 18/529,814

(22) Filed: Dec. 5, 2023

(65) Prior Publication Data

US 2025/0178542 A1 Jun. 5, 2025

(51) Int. Cl.
*B60R 11/02* (2006.01)
*F16M 11/04* (2006.01)
*F16M 11/20* (2006.01)

(52) U.S. Cl.
CPC ......... *B60R 11/0229* (2013.01); *F16M 11/04* (2013.01); *F16M 11/2021* (2013.01)

(58) Field of Classification Search
CPC .... F16M 11/04; F16M 11/10; F16M 11/2007; F16M 11/2021; F16M 11/18; B60R 11/0229; B63B 2017/0054; B63B 9/00
See application file for complete search history.

(56) References Cited

U.S. PATENT DOCUMENTS

| | | | |
|---|---|---|---|
| 4,691,886 A * | 9/1987 | Wendling | F16M 11/10 248/920 |
| 5,685,107 A | 11/1997 | Sweet | |
| 6,019,325 A * | 2/2000 | Dotson | B63B 49/00 248/219.2 |
| 6,168,126 B1 | 1/2001 | Stafford | |
| 6,173,933 B1 * | 1/2001 | Whiteside | F16M 11/38 248/282.1 |
| 6,585,201 B1 | 7/2003 | Reed | |
| 7,380,759 B1 * | 6/2008 | Whiteside | F16M 11/041 248/221.11 |
| 7,384,087 B2 * | 6/2008 | Littlejohn | B62J 11/00 108/50.01 |
| 7,744,046 B1 | 6/2010 | Lundy | |
| 9,168,982 B1 | 10/2015 | Robichaux, Jr. | |
| 9,307,832 B1 * | 4/2016 | Cameron | F16M 11/28 |
| 9,623,940 B1 | 4/2017 | Robichaux, Jr. | |
| 9,989,191 B2 * | 6/2018 | Parker | B60N 3/002 |
| 10,293,900 B1 * | 5/2019 | Leonard | F16M 11/26 |
| 10,717,501 B1 * | 7/2020 | Gilhooley | G03B 29/00 |
| 11,021,215 B1 | 6/2021 | Price et al. | |
| 11,667,359 B2 * | 6/2023 | Corley | F16M 13/02 307/104 |
| 12,024,094 B2 * | 7/2024 | Henry, Jr. | F16M 11/10 |
| 2001/0042812 A1 * | 11/2001 | Perzewski | B60R 11/0252 248/27.1 |

(Continued)

OTHER PUBLICATIONS

"Mounts", Beatdown Outdoors LLC, 2024, https://beatdownoutdoors.com/mounts.

(Continued)

*Primary Examiner* — Eret C Mcnichols
(74) *Attorney, Agent, or Firm* — Alston & Bird LLP

(57) ABSTRACT

A mount assembly for mounting a visual display of an electronic device on a watercraft is provided. The mount assembly includes a base configured to be coupled to the watercraft, an elongated extension coupled to the base, and a mounting plate coupled to the elongated extension. The elongated extension is configured to pivot relative to the base from a first position to a second position. The mounting plate is configured to allow the visual display of the electronic device to be mounted thereto.

20 Claims, 15 Drawing Sheets

(56) References Cited

U.S. PATENT DOCUMENTS

| | | | |
|---|---|---|---|
| 2007/0164176 A1* | 7/2007 | Liao | F16M 13/02 |
| | | | 248/176.3 |
| 2023/0312063 A1* | 10/2023 | Corley | F16M 11/10 |
| | | | 307/104 |

OTHER PUBLICATIONS

"Flexible Draw Latch Part No. 220-500SS", *Sierra Pacific Engineering and Products*, Retrieved from Internet Mar. 5, 2024, https://spep.com/item/products/latches/draw-latches/rubber-pull-draw-latches/sku-220-500ss.

"Mini Rotary Latch-Right Handed", *Allegis*, 2024, https://www.allegiscorp.com/MINI-ROTARY-LATCH-RIGHT-HANDED.

"BoatEFX Non Locking Dual Graph Mount—Bow", *BoatEFX*, 2022, https://boatefx.com/products/boatefx-non-locking-dual-graph-mount-bow.

"Bass Pro Shops Lockdown Bow-Mount for Marine Electronics", *Bass Pro Shops*, Retrieved from Internet Mar. 5, 2024, https://www.basspro.com/shop/en/bass-pro-shops-lockdown-bow-mount-for-marine-electronics.

"Folding Double Monitor Mount with Bridge or Swivel Mount Base", *Cornfield Fishing Gear*, 2024, https://cornfieldfishinggear.com/product/folding-double-monitor-mount-with-bridge.

\* cited by examiner

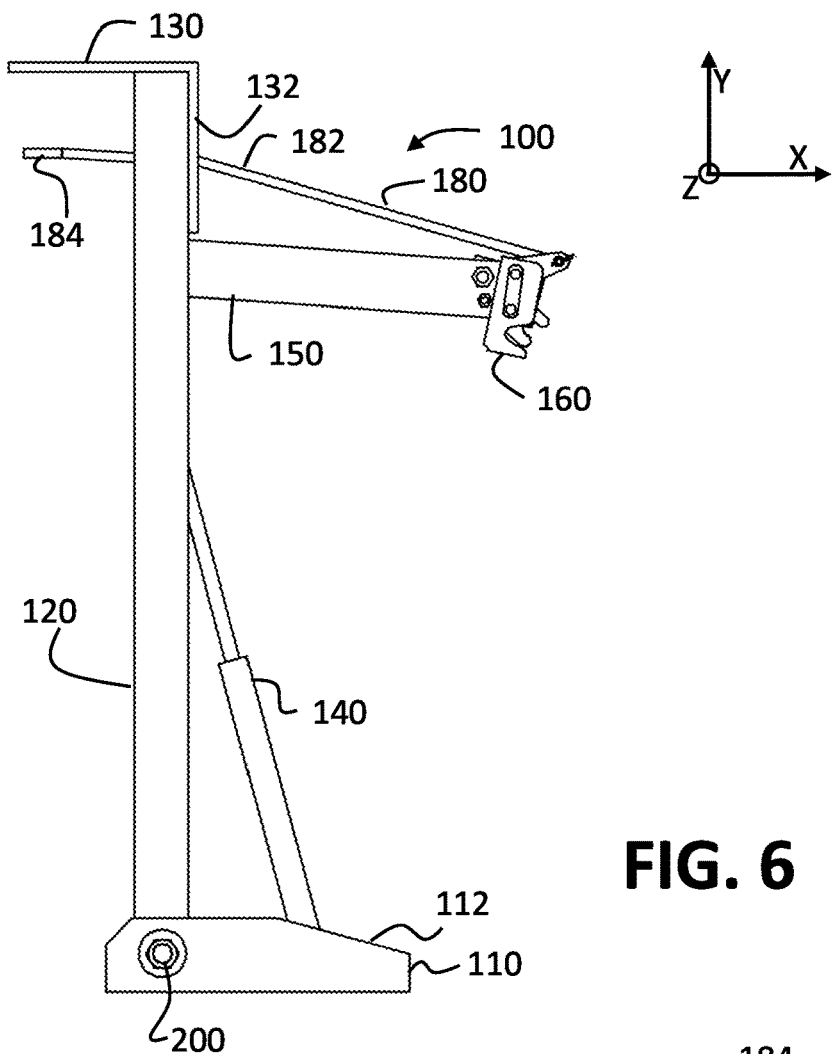
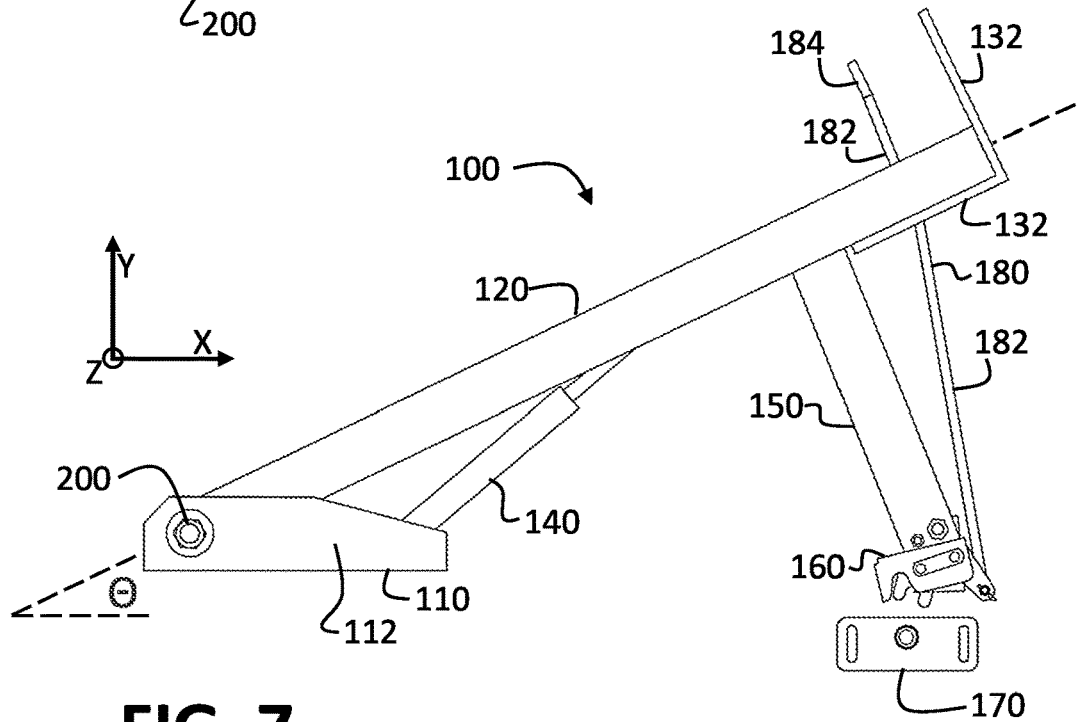
FIG. 6
FIG. 7

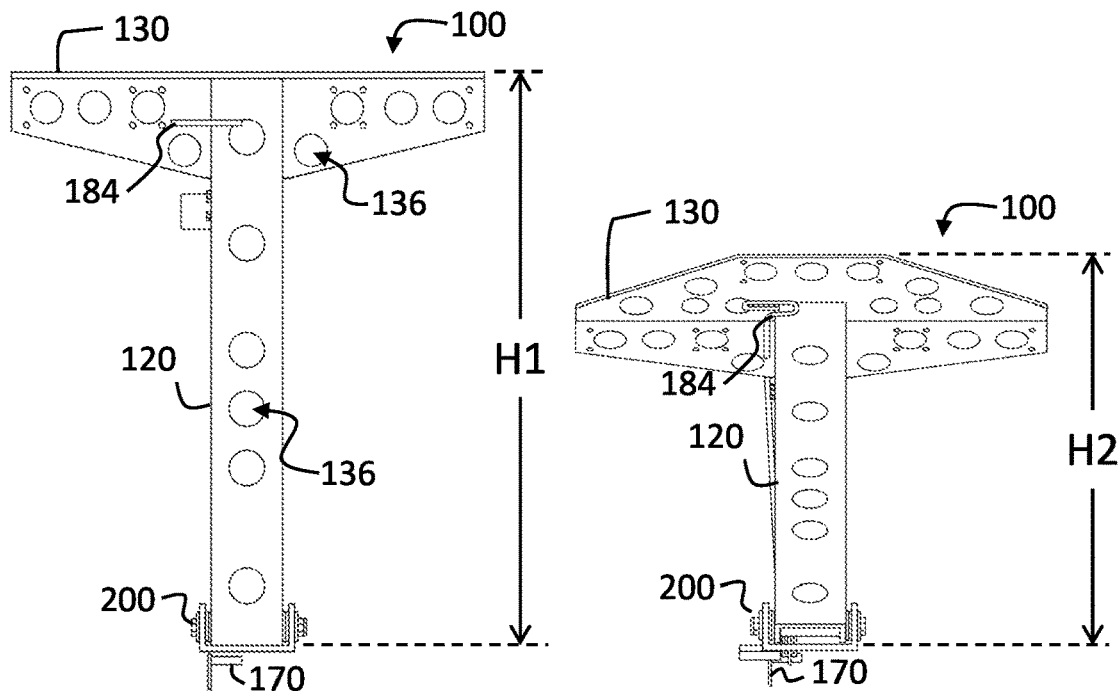
FIG. 8A   FIG. 8B
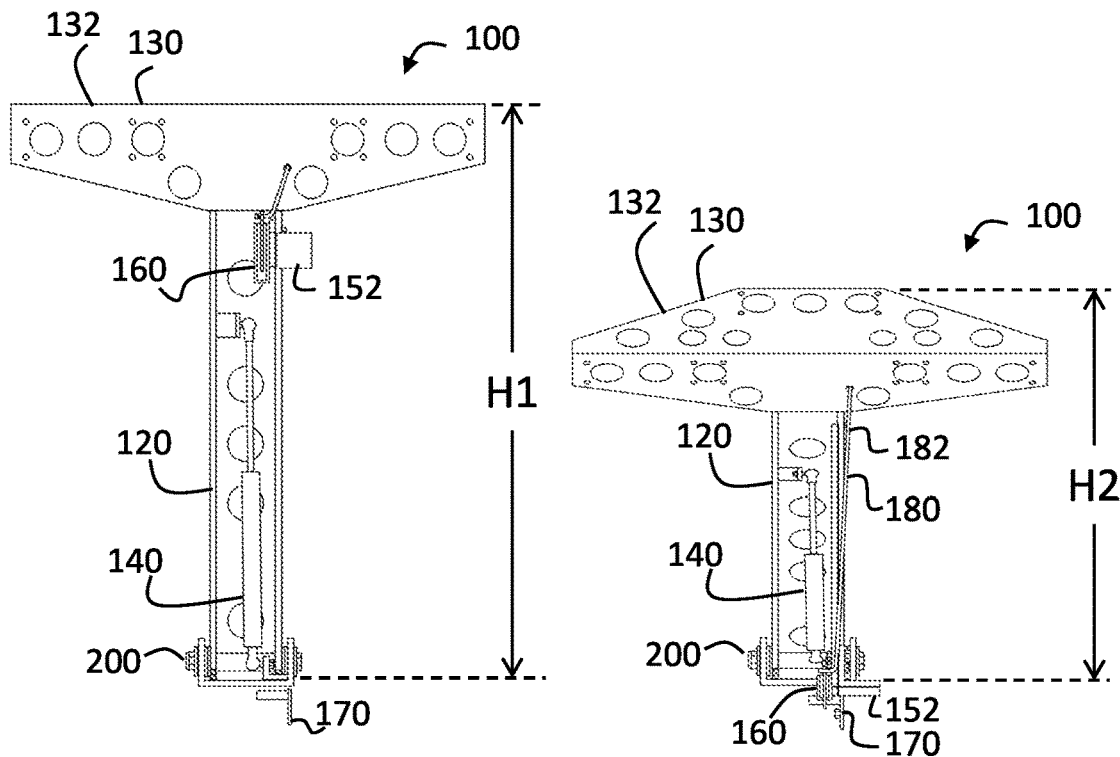
FIG. 8C   FIG. 8D

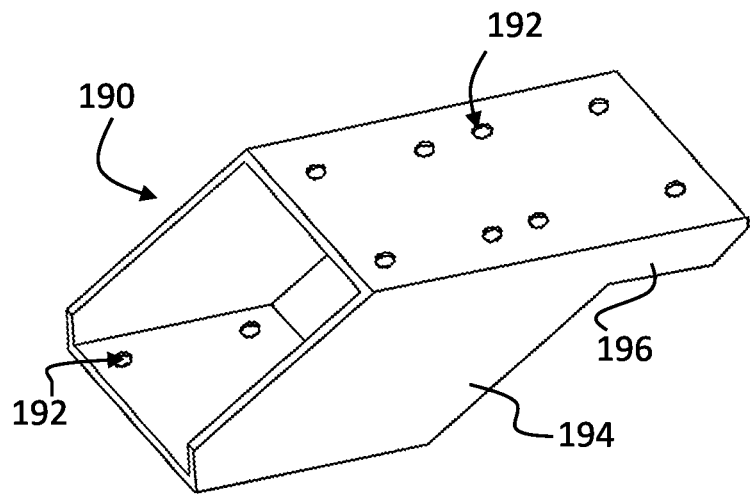
FIG. 14A
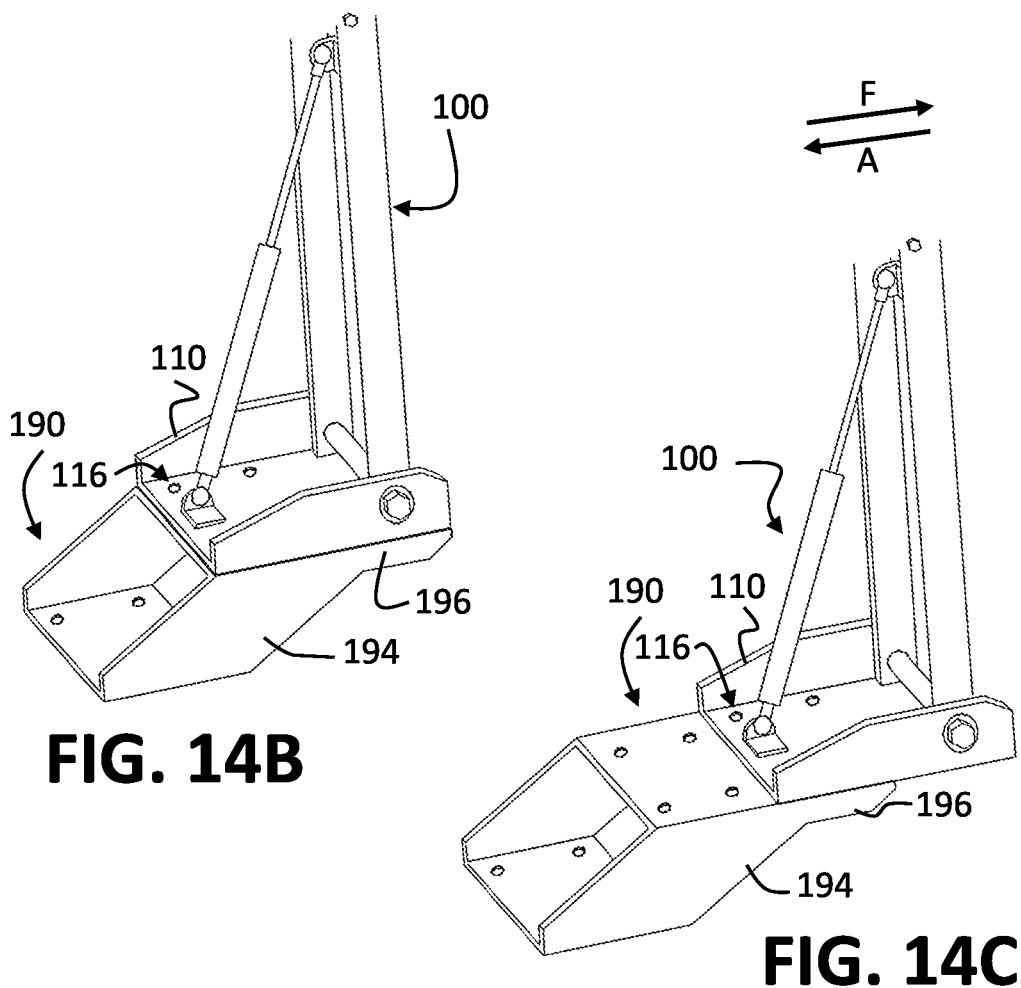
FIG. 14B
FIG. 14C

MOUNT ASSEMBLY FOR A WATERCRAFT

TECHNICAL FIELD

The present application relates generally to a mount assembly. More specifically, the present application relates to a mount assembly for mounting at least one visual display of an electronic device on a watercraft.

BACKGROUND

Electronic devices, such as fish-finding devices, are often used on watercraft to determine the location of fish, the size of fish, and the topography of the bottom of a body of water. These electronic devices often include a sonar instrument and a visual display to display information from the sonar instrument. A transducer of the sonar instrument may be placed within the body of water and may emit ultrasonic waves and receive the reflection of those ultrasonic waves. The reflected ultrasonic waves may be converted into an electrical signal and subsequently processed by the electronic device to generate an image to be displayed on the visual display. A user of the electronic device may periodically look at the visual display of the electronic device. For example, a user of the electronic device may periodically look at the electronic device to determine the location or size of fish while fishing.

The inventor has identified numerous deficiencies and problems with the existing technologies in this field. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include systems and apparatuses to provide for improved mount assemblies for mounting at least one visual display of an electronic device on a watercraft. The mount assemblies may elevate one or more visual displays of the electronic device closer to an eye level of a user. Elevating the one or more visual displays may have various benefits including reducing fatigue of the user, increasing the comfort of the user, increasing the user's visibility of the visual display, decreasing the likelihood of injury to the user (e.g., decreasing the likelihood of a repetitive strain injury), etc.

In various aspects, the mount assembly can include a base configured to be coupled to the watercraft, an elongated extension coupled to the base, and a mounting plate coupled to or monolithic with the elongated extension. The mounting plate can be configured to allow the one or more visual displays of the electronic device to be mounted to the mounting plate. The elongated extension can be configured to pivot relative to the base from a first position to a second position.

In various examples, the mount assembly includes a biasing device configured to bias the elongated extension toward the first position. The biasing device may be a gas spring.

In various examples, the mount assembly includes a locking mechanism that is configured to prevent the elongated extension from moving away from the second position when the elongated extension is in the second position. The locking mechanism may be configured to engage a retaining mechanism that is coupled to the watercraft to prevent the elongated extension from moving away from the second position. The locking mechanism may be a latch.

In various examples, the locking mechanism is coupled to the elongated extension. The mount assembly may include a locking mechanism release that is configured to disengage the locking mechanism to allow the elongated extension to move from the second position.

In various examples, the locking mechanism release is positioned at least partially forward of the elongated extension. The forward direction may be defined by the watercraft.

In various examples, the mount assembly includes a support leg that is coupled to the elongated extension and a support foot that is coupled to the support leg. The support foot may be configured to rest on the main body of the watercraft when the elongated extension is in the second position. The support foot may include a compressible pad.

In various examples, the support leg extends at an angle relative to a longitudinal axis defined by the elongated extension. The angle may be at least 0 degrees and up to 120 degrees.

In various examples, the mount assembly includes a locking mechanism that is coupled to the support leg. The locking mechanism may be configured to prevent the elongated extension from moving from the second position when the elongated extension is in the second position.

In various examples, the mounting plate defines at least one mounting hole for mounting the one or more visual displays of the electronic device.

In various examples, the mount assembly includes a riser that is coupled to the base. The riser may include a box-shaped body and an overhang. The riser may include a box-shaped body that extends at an angle in a forward direction defined by the watercraft.

In various examples, the mount assembly includes a biasing device configured to bias the elongated extension toward the first position, a locking mechanism that is configured to prevent the elongated extension from moving away from the second position when the elongated extension is in the second position, a locking mechanism release that is configured to disengage the locking mechanism to allow the elongated extension to move from the second position, a support leg that is coupled to the elongated extension, and a support foot that is coupled to the support leg. The support foot may be configured to rest on the main body of the watercraft when the elongated extension is in the second position. The locking mechanism may be configured to engage a retaining mechanism that is coupled to the watercraft to prevent the elongated extension from moving away from the second position. The support leg may extend at an angle relative to a longitudinal axis defined by the elongated extension, the angle may be at least 0 degrees and up to 120 degrees.

In various examples, the locking mechanism is coupled to the support leg. The locking mechanism release may be positioned at least partially forward of the elongated extension, the forward direction being defined by the watercraft.

In various aspects, a watercraft is provided. The watercraft may include a main body, an electronic device that includes one or more visual displays, and a mount assembly coupled to the main body. The mount assembly may include a base configured to be coupled to the watercraft, an elongated extension coupled to the base, and a mounting plate coupled to or monolithic with the elongated extension. The elongated extension may be configured to pivot relative to the base from a first position to a second position. The one or more visual displays of the electronic device may be coupled to the mounting plate of the mount assembly.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
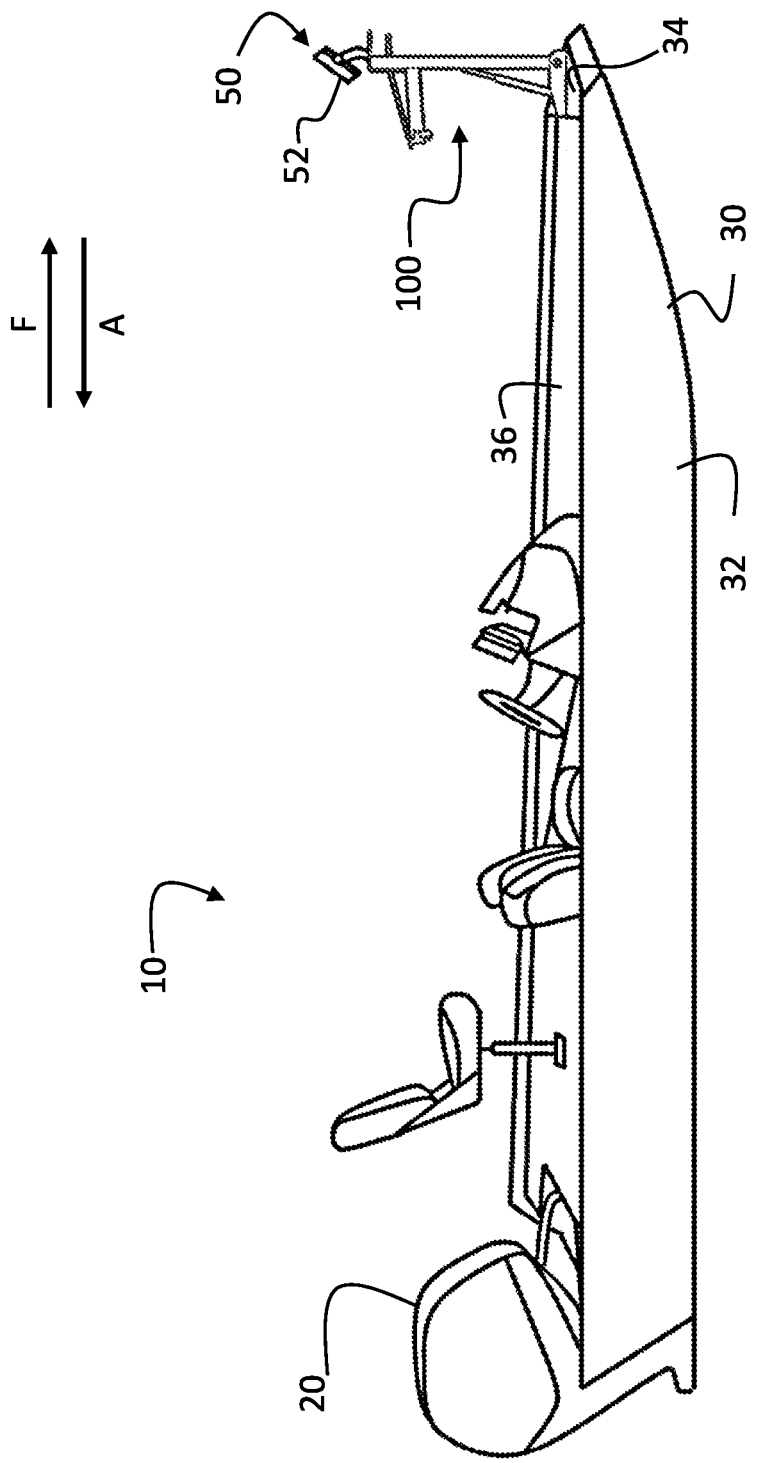

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 provides a side view of a watercraft, in accordance with an example embodiment.

Figure 2:
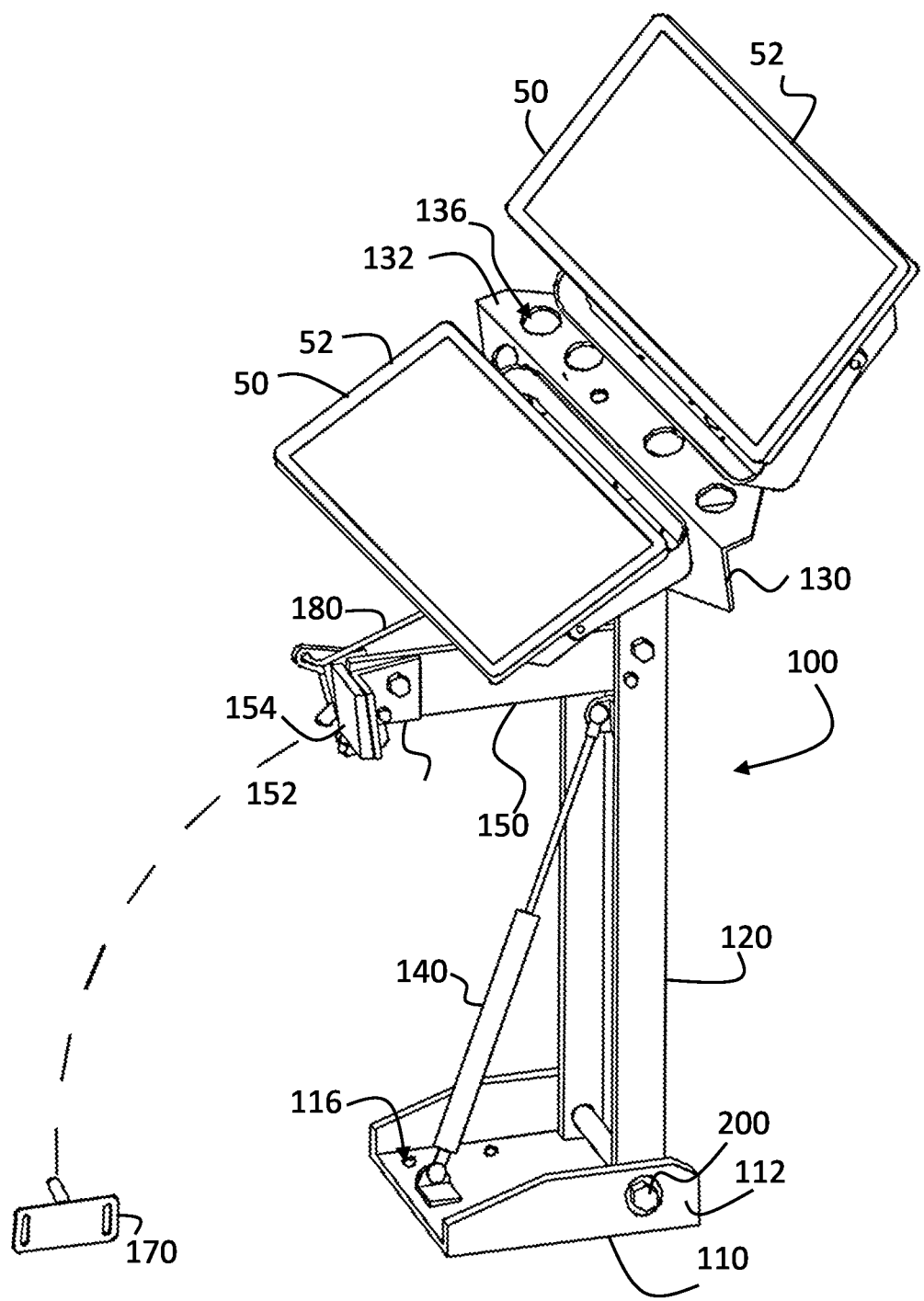

FIG. 2 provides a perspective view of a mount assembly in a first position with at least one visual display attached to the mount assembly, in accordance with an example embodiment.

Figure 3:
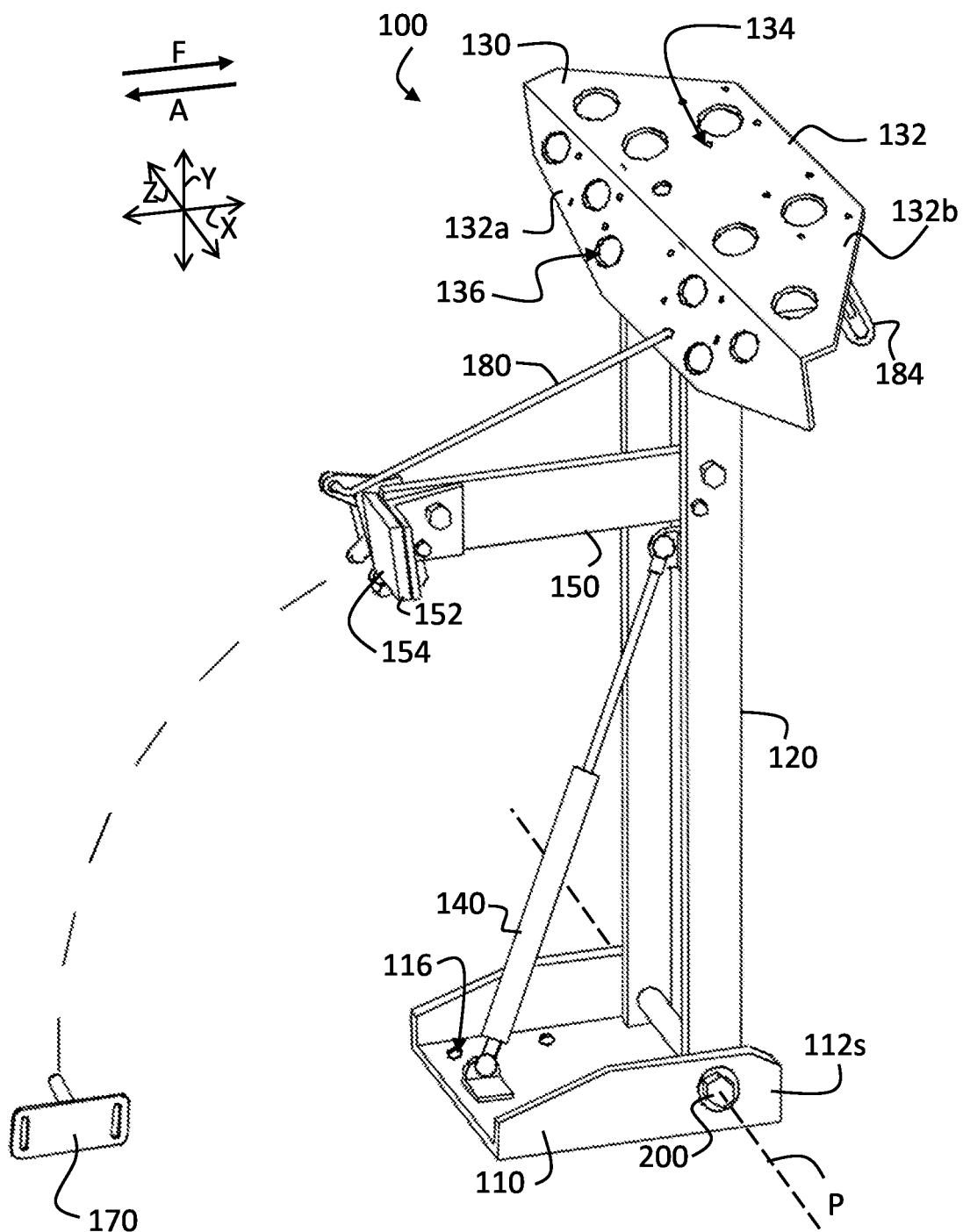

FIG. 3 provides a perspective view of the mount assembly of FIG. 2 in a first position, in accordance with an example embodiment.

Figure 4:
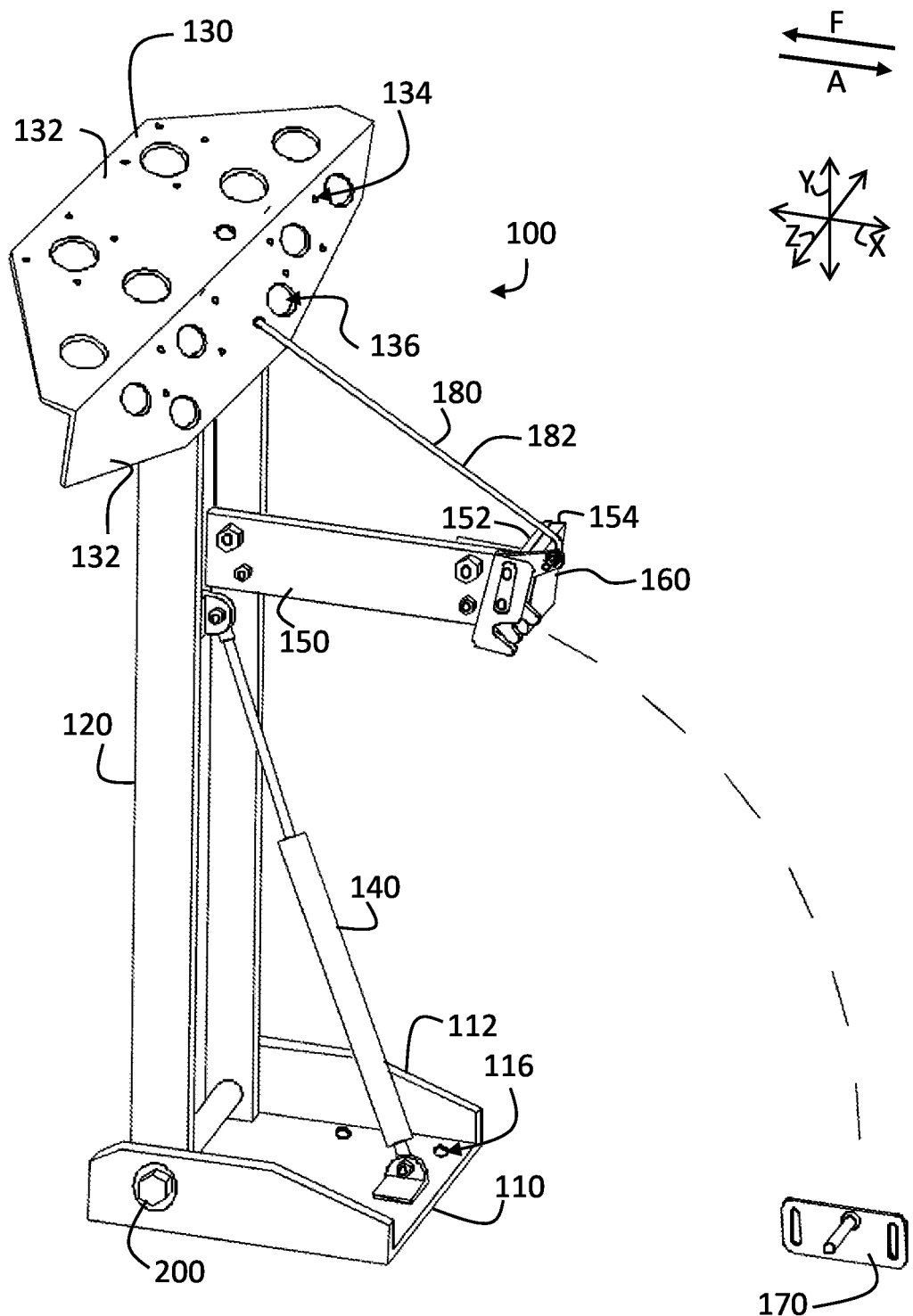

FIG. 4 provides a perspective view of the mount assembly of FIG. 2 in a first position, in accordance with an example embodiment.

Figure 5:
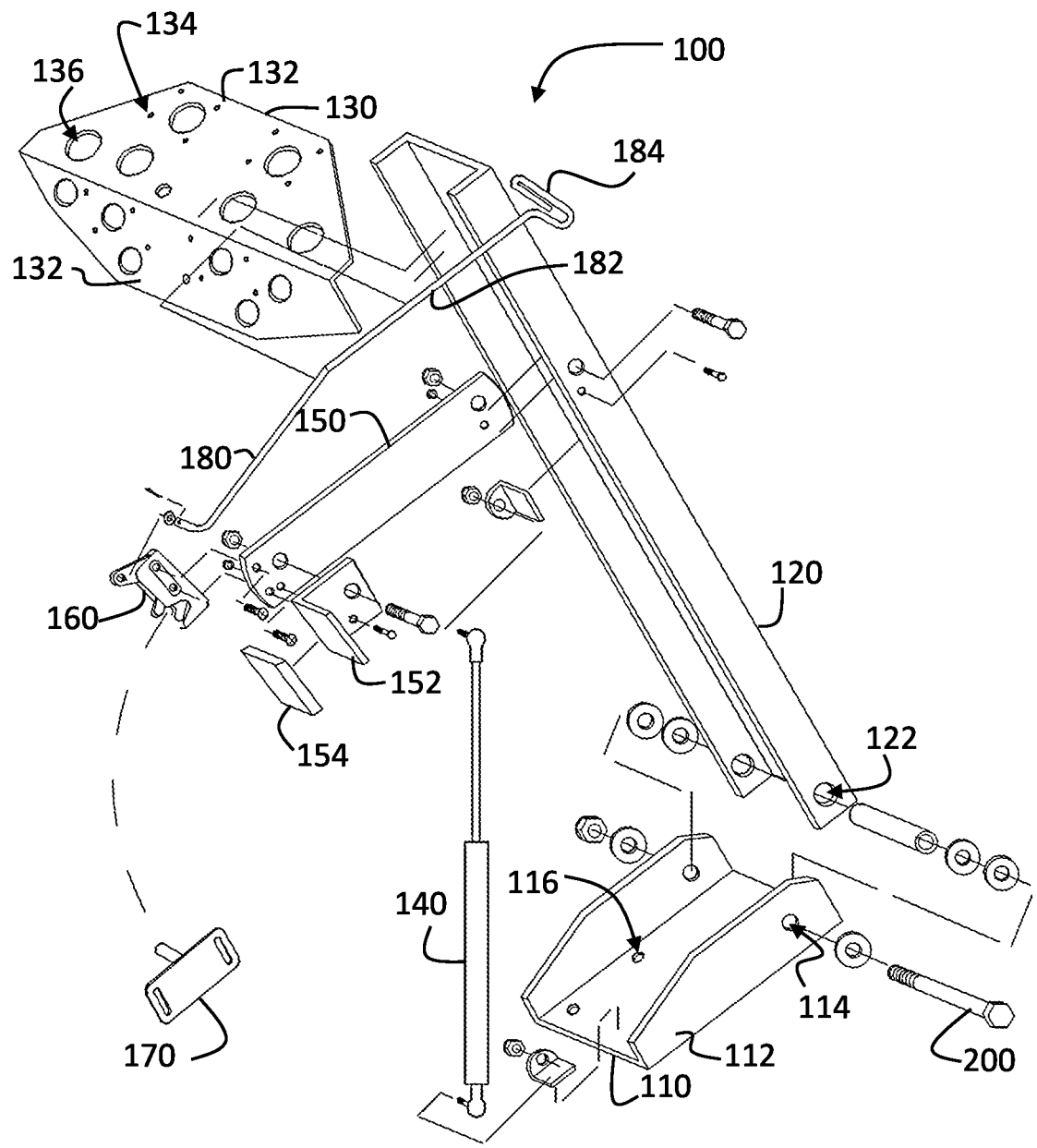

FIG. 5 provides an exploded view of the mount assembly of FIG. 2, in accordance with an example embodiment.

FIG. 6 provides a side view of the mount assembly of FIG. 2 in a first position, in accordance with an example embodiment.

FIG. 7 provides a side view of the mount assembly of FIG. 2 in a second position, in accordance with an example embodiment.

FIG. 8A provides a back view of the mount assembly of FIG. 2 in a first position, in accordance with an example embodiment.

FIG. 8B provides a back view of the mount assembly of FIG. 2 in a second position, in accordance with an example embodiment.

FIG. 8C provides a front view of the mount assembly of FIG. 2 in a first position, in accordance with an example embodiment.

FIG. 8D provides a front view of the mount assembly of FIG. 2 in a second position, in accordance with an example embodiment.

Figure 9:
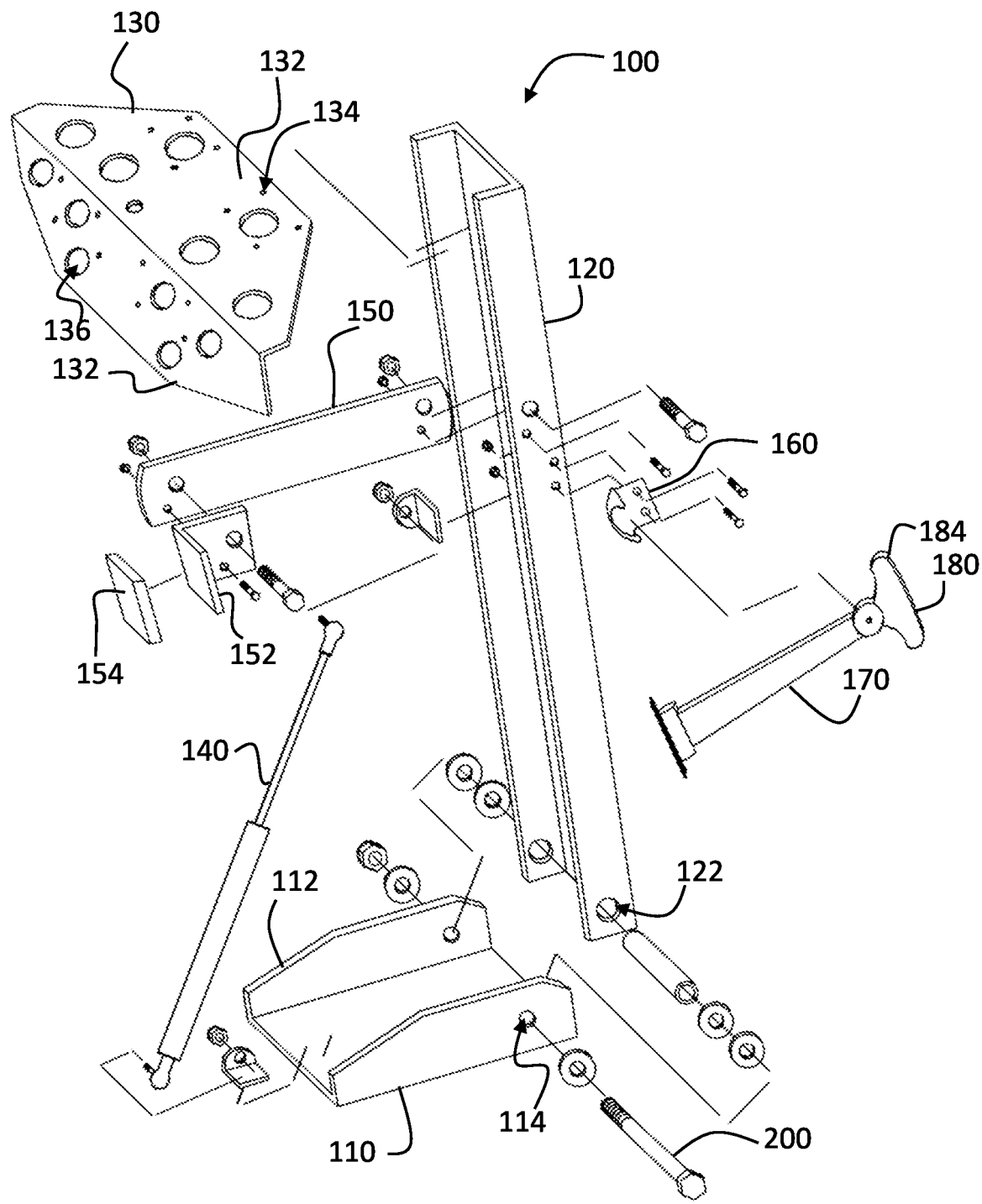

FIG. 9 provides an exploded view of a mount assembly, in accordance with an example embodiment.

Figure 10A:
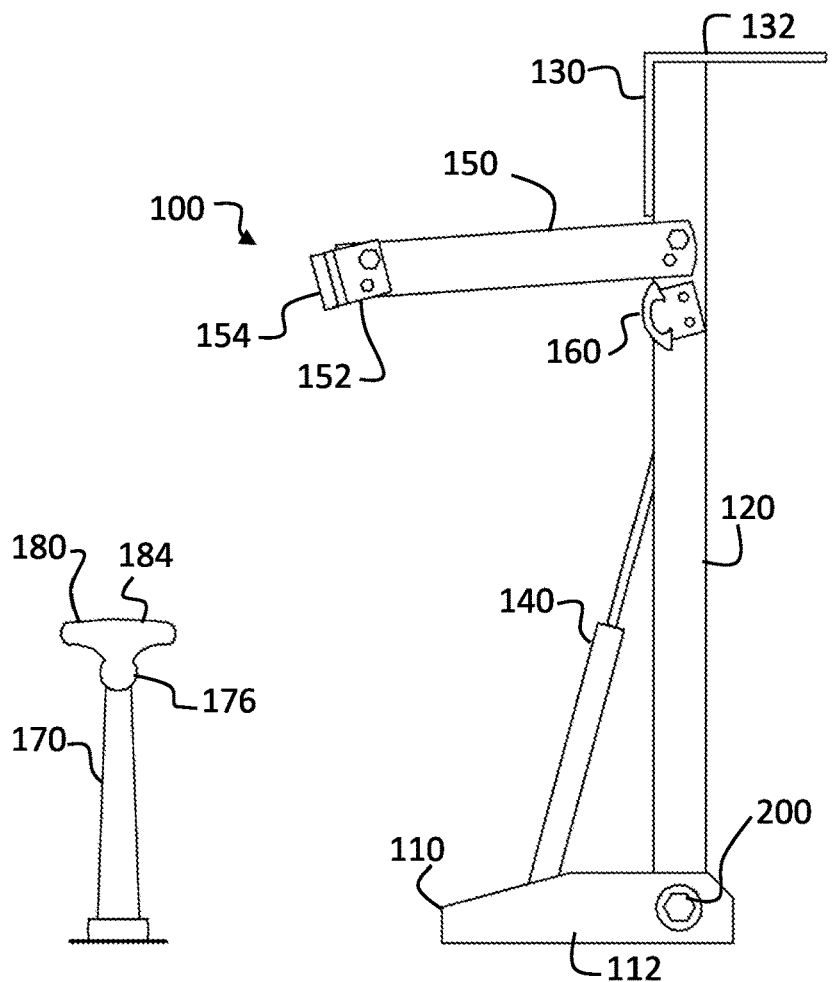

FIG. 10A provides a side view of a mount assembly in a first position, in accordance with an example embodiment.

Figure 10B:
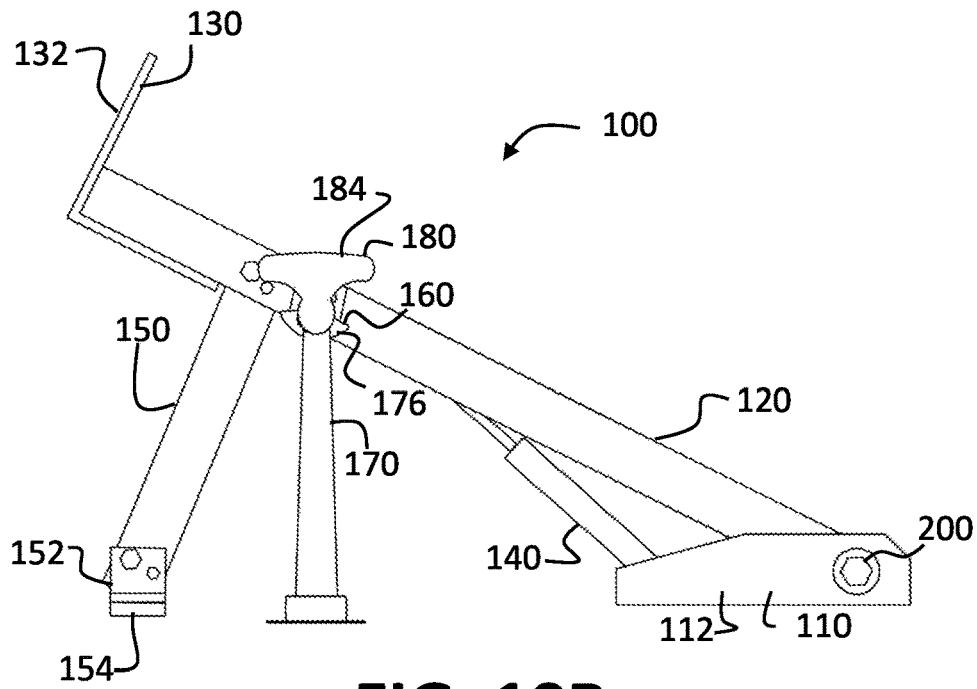

FIG. 10B provides a side view of a mount assembly in a second position, in accordance with an example embodiment.

Figure 11:
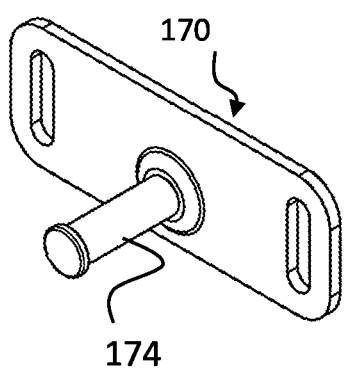

FIG. 11 provides a perspective view of a retaining mechanism, in accordance with an example embodiment.

Figure 12:
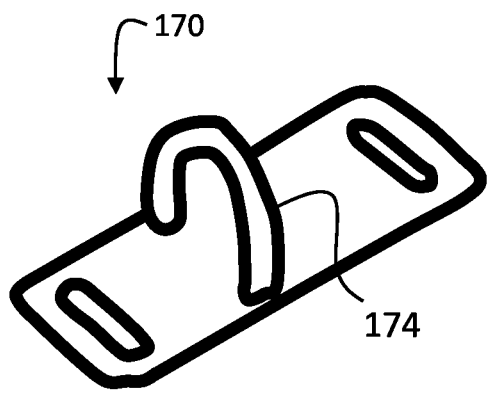

FIG. 12 provides a perspective view of a retaining mechanism, in accordance with an example embodiment.

Figure 13:
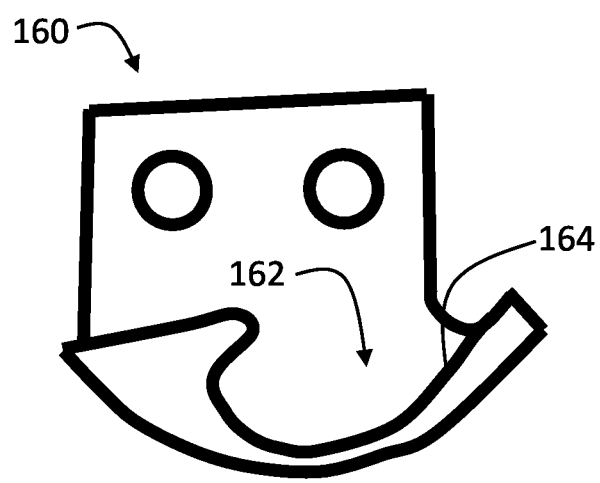

FIG. 13 provides a perspective view of a locking mechanism, in accordance with an example embodiment.

FIGS. 14A-14C provide perspective views of a riser, in accordance with an example embodiment.

Figure 15A:
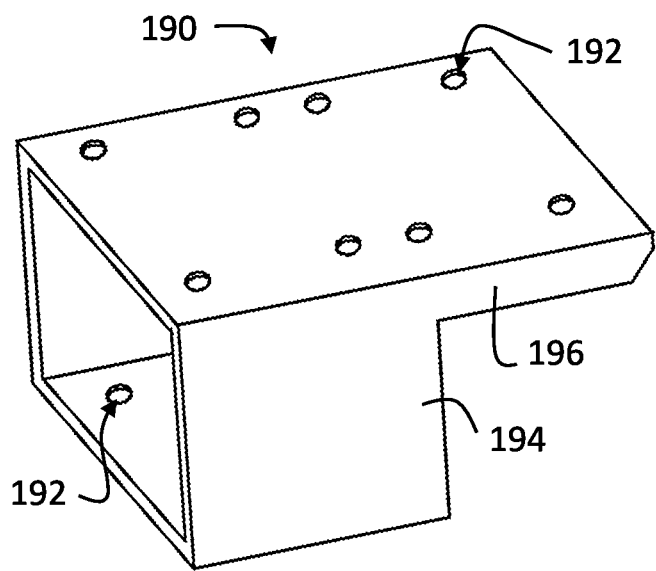
Figure 15B:
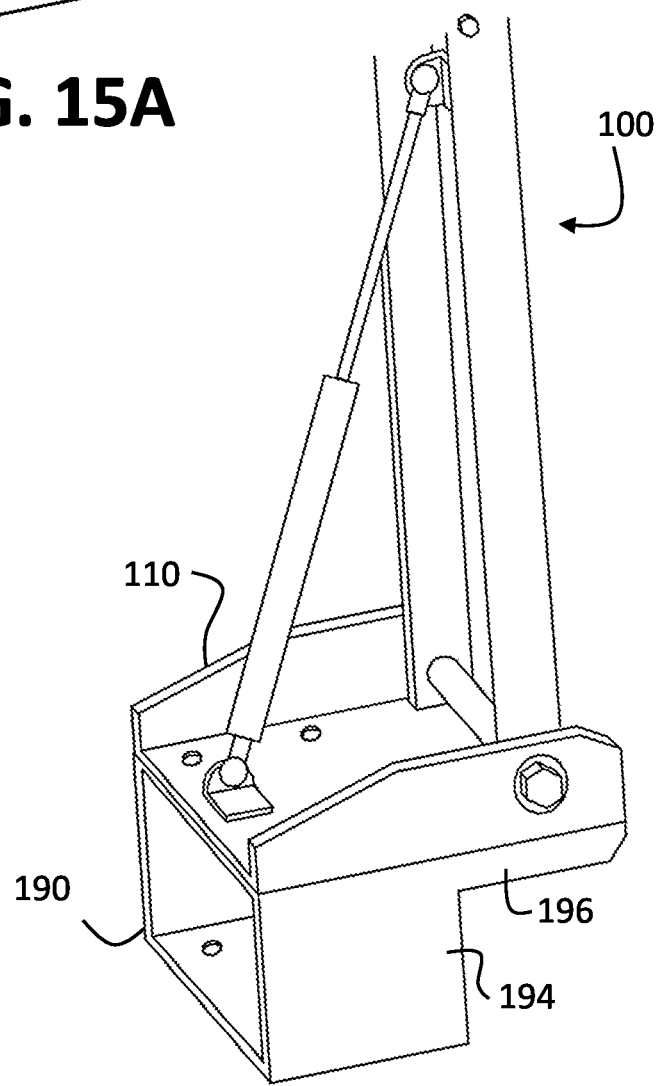

FIGS. 15A-15B provide perspective views of a riser, in accordance with an example embodiment.

Figure 16A:
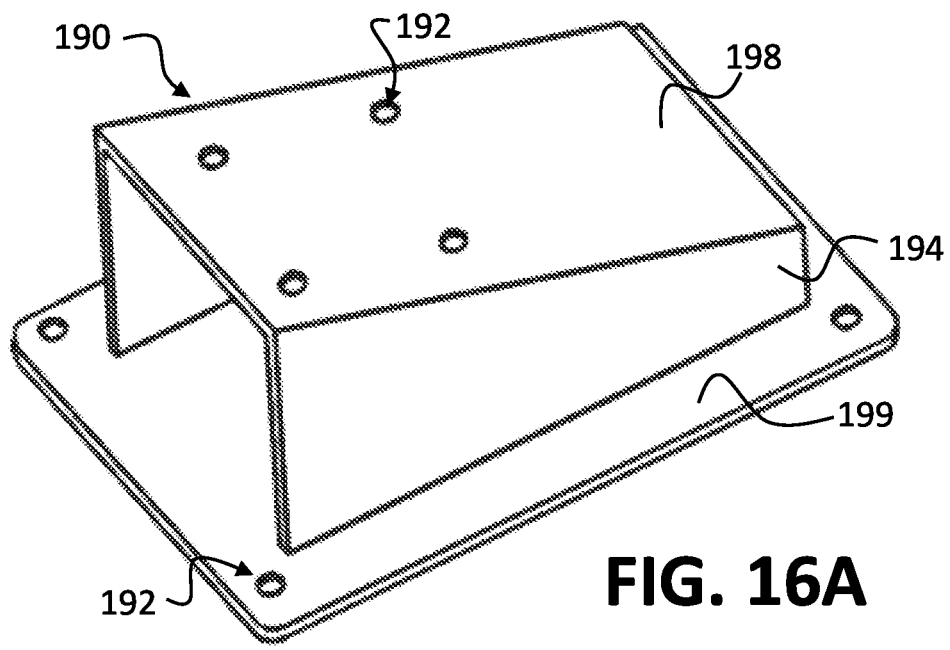
Figure 16B:
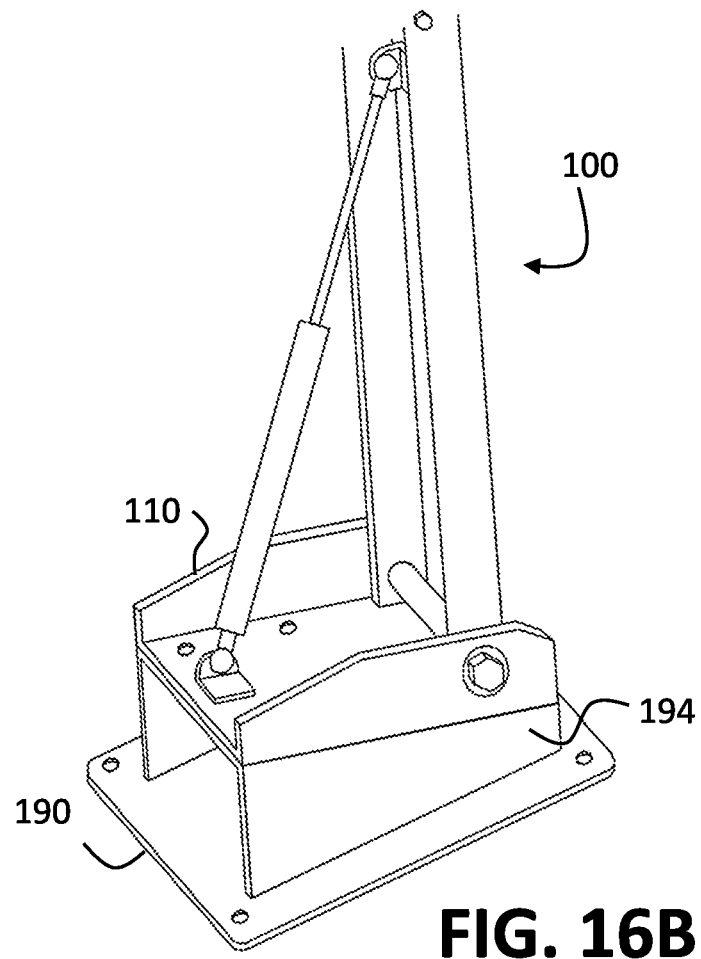

FIGS. 16A-16B provide perspective views of a riser, in accordance with an example embodiment.

Figure 17:
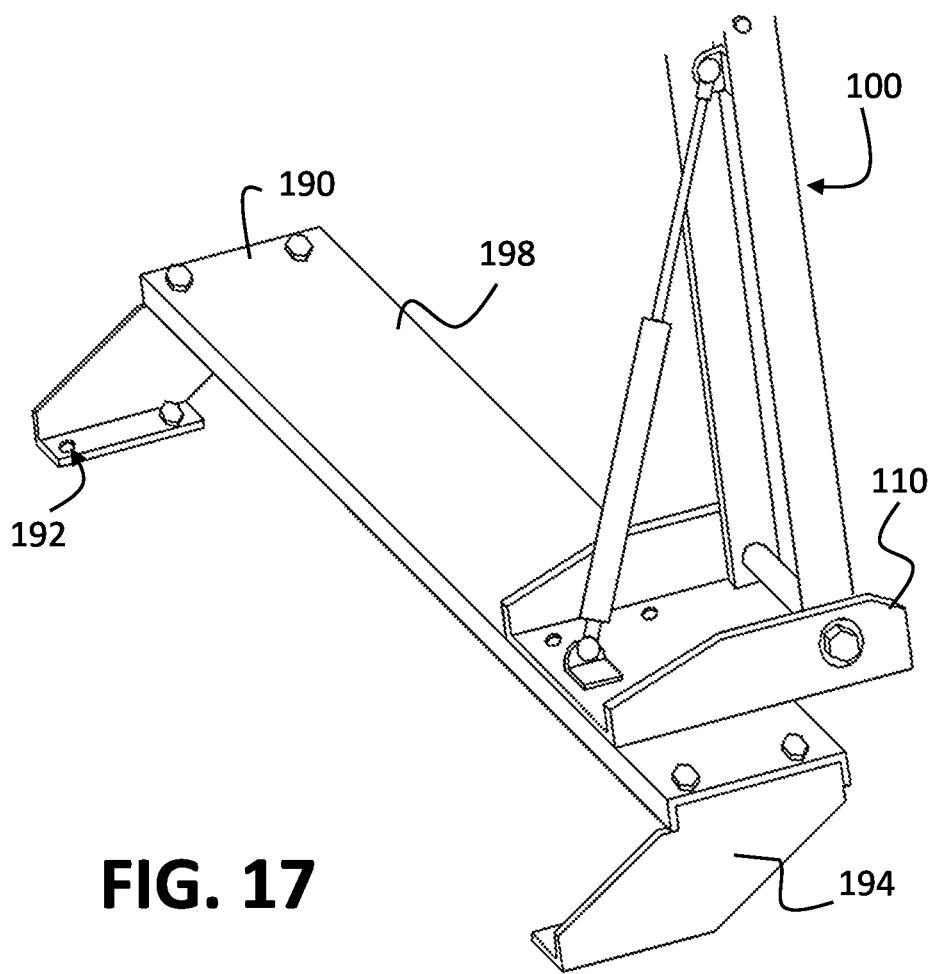

FIG. 17 provides a perspective view of a riser, in accordance with an example embodiment.

Figure 18A:
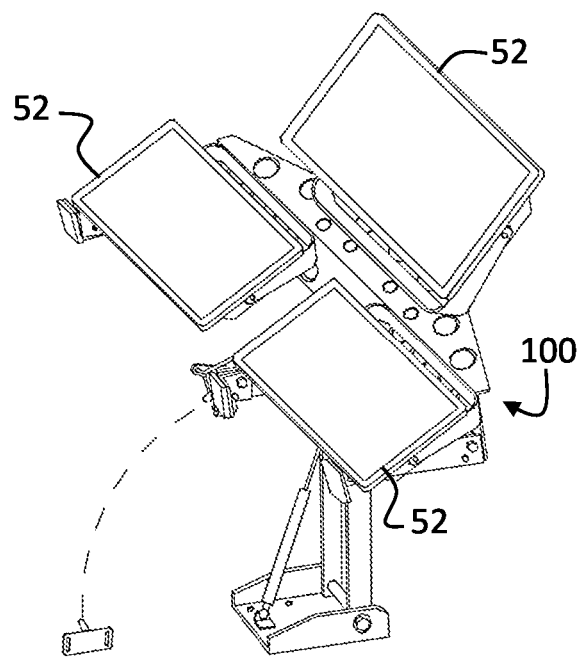
Figure 18B:
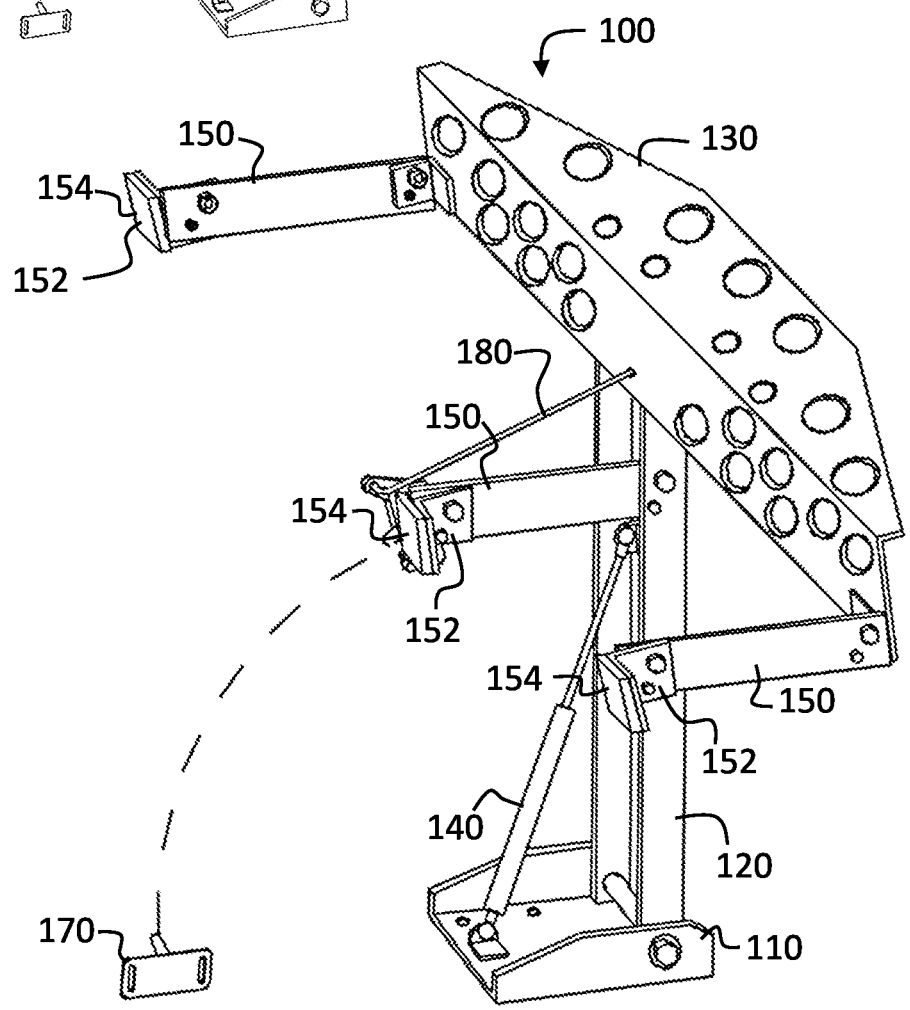

FIGS. 18A-18B provide perspective views of a mount assembly, in accordance with an example embodiment.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the term "exemplary" means serving as an example, instance, or illustration. Any aspect or design described herein as "exemplary" is not necessarily to be construed as preferred or advantageous over other aspects or designs. Rather, use of the word exemplary is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "coupled," "fixed," "attached to," and the like refer to both direct coupling, fixing, or attaching, as well as indirect coupling, fixing, or attaching through one or more intermediate components or features, unless otherwise specified herein.

As used herein, the term "positioned directly on" refers to a first component being positioned on a second component such that they make contact. Similarly, as used herein, the term "positioned directly between" refers to a first component being positioned between a second component and a third component such that the first component makes contact with both the second component and the third component. In contrast, a first component that is "positioned between" a second component and a third component may or may not have contact with the second component and the third component. Additionally, a first component that is "positioned between" a second component and a third component is positioned such that there may be other intervening components between the second component and the third component other than the first component.

As used herein, terms of approximation, such as "approximately," "substantially," or "about," refer to being within manufacturing or engineering tolerances. For example, terms of approximation may refer to being within a five percent margin of error.

Referring now to FIG. 1, a side view of a watercraft 10 is provided, in accordance with an example embodiment. The watercraft 10 may define a forward direction F and an aft direction A. The watercraft 10 may include a main body 30 and at least one propulsor 20, such as a motor, coupled to the main body 30 of the watercraft 10. The at least one propulsor 20 may be configured to propel the watercraft 10 through the water.

The main body 30 of the watercraft 10 may include a hull 32 that may be positioned at least partly in a body of water. The main body 30 of the watercraft 10 may include a deck 36 that may be stood on by a user to, for example, fish in the body of water. In various examples, the main body 30 of the watercraft 10 may include gunwales, which are positioned at upper edges of the hull 32 to provide extra rigidity to the hull 32. The main body 30 of the watercraft 10 may include a bow cap 34 that may be coupled to other components of the main body 30 at the forward end of the watercraft 10. The main body 30 of the watercraft 10 may include various other components, structures, or assemblies that define outer surfaces of the watercraft 10.

Referring now to FIG. 2, a perspective view of a mount assembly 100 is provided, in accordance with an example embodiment. The mount assembly 100 may be configured to allow at least one visual display 52, such as at least two, such as at least three visual displays 52 of an electronic device 50 to be mounted to the mount assembly 100. The mount assembly 100 may be configured to allow other components of the electronic device 50 to be coupled to the mount assembly 100. For example, a GPS device, battery monitoring device, auxiliary power device, auxiliary lighting device, and/or a phone or camera mount device may be coupled to the mount assembly 100.

Referring briefly back to FIG. 1, the mount assembly 100 may be coupled to the main body 30 of a watercraft 10. For example, the mount assembly 100 may be coupled to the deck 36, the hull 32, and/or the bow cap 34 of the main body 30. In various examples, the mount assembly 100 is coupled to various other components, structures, or assemblies that define an outer surface of the watercraft 10.

Referring now to FIGS. 3-5, perspective views of the mount assembly 100 of FIG. 2 are provided, in accordance with an example embodiment. The mount assembly 100 may define an X direction, a Y direction that is orthogonal to the X direction, and a Z direction that is orthogonal to the X direction and the Y direction. The Y direction may be a vertical direction and the X direction and the Z direction may be horizontal directions. When the mount assembly 100 is coupled to a watercraft 10, the X direction may extend parallel to the forward direction F and the aft direction A defined by the watercraft 10. The X direction may be parallel to a longitudinal direction defined by the watercraft and the Z direction may be parallel to a lateral direction defined by the watercraft 10.

In various examples, the mount assembly 100 includes a base 110 configured to be coupled, directly or indirectly, to the watercraft 10. For example, the base 110 may be coupled to the main body 30 of the watercraft 10 with at least one fastener, such as at least one screw, bolt, rivet, or the like that each extend through a mounting hole 116 of the base 110. The base 110 may have a cross-sectional "C" shape and may include vertically extending portions that each define openings 114 (FIG. 5) through which a bolt 200 may extend through.

In various examples, the mount assembly 100 includes an elongated extension 120 coupled to the base 110. For example, the bolt 200 that extends through the openings 114 (FIG. 5) of the base 110 may also extend through openings 122 (FIG. 5) of the elongated extension 120 to couple the elongated extension 120 to the base 110. The elongated extension 120 may have a cross-sectional "U" shape that extends at least partially, such as fully, along a length of the elongated extension 120. The elongated extension 120 may have a longitudinal length that is at least 16 inches long, such as at least 16 inches long and up to 60 inches long, such as at least 16 inches long and up to 48 inches long, such as at least 16 inches long and up to 32 inches long, such as at least 16 inches long and up to 24 inches long. For example, the longitudinal length of the extension 120 may be 20 inches long, 24 inches long, 32 inches long, or 60 inches long, to name a few examples. Providing an elongated extension 120 that has a longitudinal length that is at least 16 inches long has various benefits. For example, an elongated extension 120 that is at least 16 inches long brings the at least one visual display 52 that is coupled to the mount assembly 100 closer to an eye level of a user that is using (i.e., viewing) the at least one visual display 52 and/or increases the ergonomics of the mount assembly 100. As used herein, the term "eye level" refers to a height that is equal to a height of a user's eyes that is viewing the visual display 52.

Bringing the visual display 52 closer to eye level and/or increasing the ergonomics of the mount assembly 100 has various benefits, such as reducing fatigue of the user, increasing the comfort of the user (e.g., because of the increased ergonomics of the mount assembly 100), increasing the user's visibility of the visual display 52, decreasing the likelihood of injury to the user (e.g., decreasing the likelihood of a repetitive strain injury), etc.

Referring briefly to also FIGS. 6 and 7, the elongated extension 120 may be configured to pivot relative to the base 110 from a first position, as depicted in FIG. 6, to a second position, as depicted in FIG. 7, and vice-versa. For example, the elongated extension 120 may be configured to pivot on a pivot axis P (FIG. 3) that extends through the openings 114 of the base 110 and the openings 122 of the elongated extension 120.

Referring back to FIGS. 3-5, the mount assembly 100 may include a mounting plate 130 that may be configured to allow at least one visual display 52 (FIG. 2) of the electronic device 50 to be mounted to the mount assembly 100. The mount assembly 100 may define at least one planar surface 132. For example, the mount assembly 100 may have a cross-sectional "L" shape and may include a first planar surface 132a and a second planar surface 132b, the second planar surface may be positioned generally orthogonally (e.g., within 10 degrees, such as within 5 degrees) to the first planar surface 132a.

The mounting plate 130 may define at least one mounting hole 134 for mounting the at least one visual display 52. For example, each of the at least one mounting hole 134 may be configured to allow a fastener, such as a screw, a bolt, a rivet, or the like, to extend through the mounting hole 134 and to the visual display 52, or a component coupled to the visual display 52. The mounting plate 130 may define at least one weight reduction feature 136 that may be an orifice in the body of the mounting plate 130. The at least one weight reduction feature 136 may reduce a weight of the mounting plate 130 relative to the weight of a mounting plate 130 that did not include at least one weight reduction feature 136. Referring briefly to FIG. 8A, the elongated extension 120 may also include at least one weight reduction feature 136 to reduce the weight of the elongated extension 120. Also, base 110 may include at least one weight reduction feature 136 to reduce the weight of the base 110.

Referring back to FIGS. 3-5, the mounting plate 130 may be rigidly coupled, directly or indirectly, to or monolithic with the elongated extension 120 such that movement of the mounting plate 130 relative to the elongated extension 120 is prevented. As such, the mounting plate 130 may move with the elongated extension 120 as the elongated extension 120 moves from the first position to the second position, and vice-versa. The elongated extension 120 may be positioned between, such as positioned directly between, and coupled to, such as directly coupled to, the base 110 and the mounting plate 130.

In various examples, at least one of the mounting plate 130, the elongated extension 120, and/or the base 110 are manufactured from a metal, such as aluminum or stainless steel. At least one of the mounting plate 130, the elongated extension 120, and/or the base 110 may be manufactured from sheet metal or a metal extrusion. In various examples, at least one of the mounting plate 130, the elongated extension 120, and/or the base 110 are manufactured from a not-metal, such as a plastic.

In various examples, the mount assembly 100 includes a biasing device 140. The biasing device 140 may be configured to bias the elongated extension 120 toward the first position. The biasing force exerted by the biasing device 140 may be sufficient to maintain the position of the elongated extension 120 in the first position. For example, when the mount assembly 100 is coupled to a watercraft 10, the watercraft 10 may experience turbulence or wind gusts. The biasing force exerted by the biasing device 140 may be sufficient to counteract the forces exerted on the mount assembly 100 by the turbulence or wind gusts. The biasing device 140 may be a gas spring, as depicted in FIGS. 3-5. In various examples, the biasing device 140 may be an electric, hydraulic, or pneumatic actuator, or any other type of device, such as any other type of actuator, that can be configured to bias the biasing device 140.

In various examples, the mount assembly 100 includes a support leg 150. The support leg 150 may be coupled to the elongated extension 120. For example, the support leg 150 may be coupled to the elongated extension 120 with at least one fastener, such as at least one bolt, screw, rivet, or the like. The support leg 150 may be rigidly coupled to the elongated extension 120 such that the support leg 150 moves with the elongated extension 120. The support leg 150 may extend at an angle relative to a longitudinal axis defined by the elongated extension 120. For example, the support leg 150 may extend at an angle that is between 0 degrees and 120 degrees relative to the longitudinal axis defined by the elongated extension 120, such as at least 15 degrees and up to 120 degrees, such as at least 65 degrees and up to 115 degrees, such as at least 75 degrees and up to 105 degrees, such as at least 85 degrees and up to 95 degrees, such as about 90 degrees from the longitudinal axis defined by the elongated extension 120.

In various examples, the mount assembly 100 includes a support foot 152 that is coupled to the support leg 150. The support foot 152 may be rigidly coupled to the support leg 150 such that the support foot 152 moves with the support leg 150. The support foot 152 may have at least a portion 112 that extends at an angle relative to a longitudinal axis defined by the support leg 150. For example, the support foot 152 may extend at an angle that is at least 45 degrees and up to 135 degrees from the longitudinal axis defined by the support leg 150, such as at least 55 degrees and up to 125 degrees, such as at least 65 degrees and up to 115 degrees, such as at least 75 degrees and up to 105 degrees, such as at least 85 degrees and up to 95 degrees, such as about 90 degrees from the longitudinal axis defined by the support leg 150.

The support foot 152 may be configured to rest on the main body 30 of the watercraft 10 when the elongated extension 120 is in the second position. The support foot 152 may include a compressible pad 154 to protect the main body 30 of the watercraft 10 when the support foot 152 is resting on the main body 30. The compressible pad 154 may be manufactured from an elastomer, such as a rubber, such as a synthetic rubber, such as neoprene (i.e., polychloroprene), such as closed-cell neoprene. The support leg 150 and/or the support foot 152 may be configured to support the weight of at least portions of the mount assembly 100, such as the elongated extension 120 and the mounting plate 130, when the elongated extension 120 is in the second position.

In various examples, the mount assembly 100 includes a locking mechanism 160. The locking mechanism 160 may be coupled proximate to a distal end of the support leg 150. The locking mechanism 160 may be configured to prevent the elongated extension 120 from moving away from the second position when the elongated extension 120 is in the second position. For example, the locking mechanism 160 may be configured to engage with a retaining mechanism 170 that is coupled to the watercraft 10 to prevent the elongated extension 120 from moving away from the second position. In various examples, the locking mechanism 160 is a latch, such as a mini-rotary latch that is manufactured by ALLEGIS under part number 8-241 SS. Referring briefly to FIGS. 11 and 12, perspective views of retaining mechanisms 170, each in accordance with a different example embodiment, are provided. The retaining mechanism 170 may include an engagement portion 174 that is configured to be engaged with the locking mechanism 160. The engagement portion 174 of the retaining mechanism 170 may have any shape. For example, the engagement portion 174 may have a cylindrical shape, as depicted in FIG. 11, and/or may have an arc shape, as depicted in FIG. 12.

Referring back to FIGS. 3-5, the locking mechanism 160 may be further configured to disengage with the retaining mechanism 170 to allow the elongated extension 120 to move from the second position to the first position. For example, the mount assembly 100 may include a locking mechanism release 180 that is configured to disengage (i.e., unlock) the locking mechanism 160 (e.g., disengage the locking mechanism 160 from the retaining mechanism 170) to allow the elongated extension 120 to move from the second position.

In various examples, the locking mechanism 160 and/or the locking mechanism release 180 are electrically operated. For example, the locking mechanism 160 and/or the locking mechanism release 180 may include an electrically operated device, such as an electric motor or an electric actuator to move one or more components of the locking mechanism 160 and/or the locking mechanism release 180. One or more buttons, knobs, switches, or the like, can be provided to engage and disengage the locking mechanism 160 from the respective retaining mechanism 170.

The locking mechanism release 180 may be coupled to the locking mechanism 160. In various examples, and as depicted in FIGS. 3-5, the locking mechanism release 180 extends from the locking mechanism 160 to a position that is forward (i.e., relative to a forward direction defined by the watercraft 10 to which the mount assembly 100 may be coupled) of the elongated extension 120 and/or the mounting plate 130. In various examples, the locking mechanism release 180 extends from the locking mechanism 160 to a position that is aft of the elongated extension 120 and/or the mounting plate 130. The locking mechanism release 180 may include a rod portion 182 that may extend through orifices of the mounting plate 130 and/or the elongated extension 120. The locking mechanism release 180 may include a handle portion 184 that is at a distal end of the locking mechanism release 180. The handle portion 184 may increase the case as to which a user may grab and pull on the locking mechanism release 180. The locking mechanism 160 may be configured to disengage the locking mechanism 160 from the retaining mechanism 170 by moving at least a portion of the locking mechanism 160 away from the retaining mechanism 170, which may disengage the locking mechanism 160 from the retaining mechanism 170.

Referring now to FIGS. 6 and 7, side views of a mount assembly 100 are provided, in accordance with an example embodiment. FIG. 6 depicts the mount assembly 100 in a first position and FIG. 7 depicts the mount assembly 100 pivoting to or from a second position. As discussed, the elongated extension 120 may be configured to move from a first position to a second position, and vice-versa. When the elongated extension 120 is in its first position, the mount assembly 100 is in its first position; when the elongated extension 120 is in its second position, the mount assembly 100 is in its second position.

A mount assembly 100 that is configured to move from a first position to a second position has various benefits. For example, a user may move the mount assembly 100 to the first position to bring the visual display 52 closer to an eye level of the user when, for example, a visual display 52 that is coupled to the mount assembly 100 is desired to be used (e.g., viewed). As discussed, bringing the visual display 52 closer to an eye level of the user has various benefits, which include increasing the ergonomics of the mount assembly 100.

A user may move the mount assembly 100 to the second position when, for example, the user is not using the visual display 52 mounted to the mount assembly 100. Providing a mount assembly 100 that is configured to move to the second position has various benefits. For example, moving the mount assembly 100 to the second position may prevent the mount assembly 100 from blocking the view of an individual driving the watercraft 10 that the mount assembly 100 is coupled to. Also, moving the mount assembly 100 to the second position transfers the weight of the mount assembly 100 from the base 110 to the support foot 152. Transferring the weight of the mount assembly 100 from the base 100 to the support foot 152 may be beneficial when, for example, the watercraft 10 is being propelled through the water by the propulsor 20. As will be appreciated, when the watercraft 10 is being propelled through the water by the propulsor 20, forces, such as lateral forces, experienced by the mount assembly 100 may be far greater than when the watercraft 10 is not being propelled through the water by the propulsor 20. As such, if the mount assembly 100 was in the first position when the watercraft 10 was being propelled through the water, the mount assembly 100 and/or the main body 30 of the watercraft 10 may become damaged from the forces experienced by the mount assembly 100. As such, moving the mount assembly 100 to the second position while the watercraft 10 is being propelled through the water by the propulsor 20 may prevent damage to the mount assembly 100 and/or to the main body 30 of the watercraft 10.

Additionally, when the mount assembly 100 is in the second position, the mount assembly 100 may be coupled to the main body 30 of the watercraft 10 at multiple locations. For example, the mount assembly 100 may be coupled to the main body 30 of the watercraft 10 through the base 110 and can additionally be coupled to the main body 30 of the watercraft 10 by the locking mechanism 160 (e.g., via the retaining mechanism 170). As such, dual load paths are available for the force created by the movement of the watercraft 10 to travel through, which may reduce the magnitude of force being transmitted through the base 110. Therefore, moving the mount assembly 100 to the second position may increase the overall durability and/or strength of the mount assembly 100 when, for example, the mount assembly 100 experiences forces caused by propelling the watercraft 10 through the water by the propulsor 20.

Yet another benefit of providing a mount assembly 100 that is configured to move to the second position is that moving the mount assembly 100 to the second position may allow for protective covers to fit over the watercraft 10 without uninstalling the mount assembly 100 from the watercraft 10. For example, covers, such as custom covers (e.g., a cover supplied by the original equipment manufacturer of the watercraft 10), style-fit covers, or mooring covers are often used on watercraft 10, such as a bass boat, to protect the watercraft 10 from environmental elements when the watercraft 10 is not in use. As will be appreciated, if equipment and assemblies, such as the mount assembly 100, are installed on the boat, the covers may no longer fit over the watercraft 10. However, when the mount assembly 100 can be moved to the second position, the cover may be able to fit over the mount assembly 100 and still be able to properly attach and cover the watercraft 10.

When the mount assembly 100 is in the first position, as depicted in FIG. 6, the elongated extension 120 may extend substantially (e.g., within 5 degrees) in the Y direction, which is a vertical direction. When the mount assembly 100 is in the second position, as depicted in FIG. 7, the elongated extension 120 may extend at an angle Θ relative to the X direction, which is a horizontal direction, that is less than 45 degrees, such as less than 20 degrees, such as less than 10 degrees, such as less than 5 degrees. In various examples, the elongated extension 120 may extend at an angle Θ relative to the X direction that is at least 5 degrees and up to 45 degrees, such as at least 10 degrees and up to 35 degrees, such as at least 15 degrees and up to 30 degrees, such as at least 20 degrees and up to 30 degrees.

Referring now to FIGS. 8A-8D, front and back views of a mount assembly 100 are provided, in accordance with an example embodiment. FIG. 8A depicts a back view of the mount assembly 100 in the first position, FIG. 8B depicts a back view of the mount assembly 100 in the second position, FIG. 8C depicts a front view of the mount assembly 100 in the first position, and FIG. 8D depicts a front view of the mount assembly 100 in the second position. When the mount assembly 100 is in the first position, as depicted in FIGS. 8A and 8C, the mount assembly 100 may define a first height H1. When the mount assembly 100 is in the second position, as depicted in FIGS. 8B and 8D, the mount assembly 100 may define a second height H2, which is less than the first height H1. A ratio (H1:H2 ratio) between the first height H1 and the second height H2 may be at least 5:4. For example the H1:H2 ratio may be at least 5:4 and up to 5:1, such as at least 5:4 and up to 4:1, such as at least 5:4 and up to 3:1, such as at least 5:4 and up to 2:1, such as approximately 3:2. Providing a mount assembly 100 that defines an H1:H2 ratio that is at least 5:4 and up to 3:1 has various benefits. For example, the mount assembly 100 that defines an H1:H2 ratio that is at least 5:4 and up to 4:1 may allow the mount assembly 100 to bring the visual display 52 to a height that increases the comfort of a user using the visual display 52 when the mount assembly 100 is in the first position while also allowing the mount assembly 100 to bring the visual display 52 to a height that increases the visibility of a user that is operating the watercraft 10 when the mount assembly 100 is in the second position.

Referring now to FIGS. 9, 10A, and 10B, views of a mount assembly 100 are provided, in accordance with an example embodiment. FIG. 9 provides an exploded view of the mount assembly 100, FIG. 10A provides a side view of the mount assembly 100 in the first position, and FIG. 10B provides a side view of the mount assembly 100 in the second position. As discussed, the mount assembly 100 may include a locking mechanism 160 that may be configured to engage with a retaining mechanism 170 that is coupled to the watercraft 10 to prevent the elongated extension 120 from moving away from the second position.

In various examples, the locking mechanism 160 is coupled to the elongated extension 120. Referring briefly to FIG. 13, which provides a perspective view of the locking mechanism 160 in accordance with an example embodiment, the locking mechanism 160 may include a cup-shaped portion 162. The cup-shaped portion 162 of the locking mechanism 160 may define a notch 164. The notch 164 may have a curved shape, such as a "U" shape.

Referring back to FIGS. 9, 10A, and 10B, the retaining mechanism 170 may include a retaining feature 176 that is configured to be positioned within the cup-shaped portion 162 of the locking mechanism 160. The retaining feature 176 that is configured to be positioned within the cup-shaped portion 162 may generally have a shape that corresponds to a shape of the notch 164 of the locking mechanism 160. For example, the notch 164 of the locking mechanism 160 may have a curved shape and the retaining feature 176 of the retaining mechanism 170 may have a curved shape, such as a semi-circular or circular shape. The notch 164 of the locking mechanism 160 may prevent the retaining feature 176 of the retaining mechanism 170 from leaving the cup-shaped portion 162 of the locking mechanism 160 when the retaining feature 176 is positioned within the locking mechanism 160.

When the mount assembly 100 is in the second position, as depicted in FIG. 10B, the biasing device 140 may bias the elongated extension 120 generally upward (e.g., toward the first position), which may also bias the locking mechanism 160 generally upward. However, when the retaining feature 176 is positioned within the cup-shaped portion 162 of the locking mechanism 160, the locking mechanism 160 in conjunction with the retaining feature 176 of the retaining mechanism 170 may prevent the elongated extension 120 from leaving the second position. For example, the locking mechanism 160 may push against the retaining feature 176 of the retaining mechanism 170. However, when the retaining mechanism 170 is coupled to the watercraft 10, the retaining feature 176 of the retaining mechanism 170 may counteract the force exerted by the biasing device 140 and prevent the locking mechanism 160 and the elongated extension 120 from moving from the second position.

In various examples, the retaining mechanism 170 may include a locking mechanism release 180 that is configured to disengage (i.e., unlock) the locking mechanism 160 (e.g., disengage the locking mechanism 160 from the retaining feature 176 of the retaining mechanism 170) to allow the elongated extension 120 to move from the second position. For example, the locking mechanism release 180 of the retaining mechanism 170 can include a handle portion 184 that may be used by a user to disengage the locking mechanism 160 from the retaining mechanism 170. In various examples, the locking mechanism 160 may be disengaged from the retaining mechanism 170 by exerting a downward force onto the elongated extension 120 (e.g., by pushing the elongated extension 120 downward by a user) while moving the retaining feature 176 of the retaining mechanism 170 away from the cup-shaped portion 162 of the locking mechanism 160 (e.g., by moving the handle portion 184 in a lateral direction), and then subsequently discontinuing the exertion of the downward force onto the elongated extension 120, which allows the elongated extension 120 to be moved from the second position to the first position by the biasing device 140. In various examples, the main body of the retaining mechanism 170 may be manufactured from a rubber, such as an ethylene propylene diene monomer, to provide flexibility to the retaining mechanism 170 so that it may be easily moved away from the cup-shaped portion 162 of the locking mechanism 160. In various examples, the retaining mechanism 170 and the locking mechanism 160 may be a rubber pull or flexible draw latch assembly that is manufactured by SIERRA PACIFIC under part number 220-500SS.

Referring now to FIGS. 14A-14C, perspective views of a riser 190 are provided, in accordance with an example embodiment. In various examples, the mount assembly 100 may include a riser 190. The riser 190 may be configured to couple the mount assembly 100 to the main body 30 of the watercraft 10. For example, one or more fasteners may extend through one or more mounting holes 116 of the base 110 of the mount assembly 100 and through one or more mounting holes 192 of the riser 190 to couple the mount assembly 100 to the riser 190. One or more fasteners may extend through one or more mounting holes of the riser 190 and to or at least partially through the main body 30 of the watercraft 10 to mount the riser 190 to the watercraft 10. A width of the riser 190 may be equal to or substantially equal to (e.g., within 10 percent, such as within 5 percent) of a width of the base 110 of the mount assembly 100. The riser 190 may be positioned between, such as positioned directly between, the main body 30 of the watercraft 10 and the base 110 of the mount assembly 100.

The riser 190 may increase the overall height of the mount assembly 100. For example, the riser 190 may have a height of at least 2 inches, such as at least 2 inches and up to 10 inches, such as at least 2 inches and up to 8 inches, such as at least 3 inches and up to 6 inches, such as at least 4 inches and up to 5 inches. As such, the riser 190 may increase the overall height of the mount assembly 100 by at least 2 inches, such as at least 2 inches and up to 10 inches, such as at least 2 inches and up to 8 inches, such as at least 2 inches and up to 4 inches, such as at least 3 inches and up to 6 inches, such as at least 4 inches and up to 5 inches. In various examples, the riser 190 may increase the overall height of the mount assembly 100 by 2 inches or by 4 inches.

The riser 190 may also setback a position of the mount assembly 100. For example, the riser 190 may have a box-shaped body that extends at an angle in the forward direction F (when installed on a watercraft 10) such that a sidewall 194 of the riser 190 has a rhombus or a rhomboid shape to allow the position of the mount assembly 100 to be positioned further in the forward direction F when mounted to the riser 190 than when not mounted to the riser 190. A plurality of mounting hole positions may be provided so that the positioning of the mount assembly 100 may be customized. For example, the position of the mount assembly 100 in FIG. 14C is more forward than the position of the mount assembly 100 in FIG. 14B. In various examples, to position the mount assembly 100 to a more forward position, the mount assembly 100 may be coupled to an overhang 196 of the riser 190, as depicted in FIG. 14C. The overhang 196 may extend from the sidewall 194 of the riser 190 in the forward direction F. The riser 190 may setback a position of the mount assembly 100 by at least 2 inches, such as at least 2 inches and up to 10 inches, such as at least 2 inches and up to 8 inches, such as at least 2 inches and less than 3 inches, such as at least 3 inches and up to 5 inches, such as at least 7 inches and up to 9 inches. In various examples, the riser 190 may setback a position of the mount assembly 100 by approximately 2 inches, 4 inches, 6 inches, and/or 8 inches.

Referring now to FIGS. 15A-15B, perspective views of a riser 190 are provided, in accordance with an example embodiment. In various examples, the riser 190 has a box-shaped body that has a sidewall 194 that has a square shape. The overhang 196 may extend from the box-shaped body in the forward direction F. A plurality of mounting hole positions may be provided so that the positioning of the mount assembly 100 may be customized.

Referring now to FIGS. 16A-16B, perspective views of a riser 190 are provided, in accordance with an example embodiment. In various examples, the riser 190 has a box-shaped body that has a sidewall 194 that has a trapezoid shape, such as a right trapezoid with two right angles. A top surface 198 of the riser 190 may be positioned at an acute angle relative to a bottom surface 199 of the riser 190. In various examples, a forward end of the top surface 198 of the riser 190 is closer to the bottom surface 199 than an aft end of the top surface 198. In various examples, a forward end of the top surface 198 of the riser 190 is closer to the bottom surface 199 than an aft end of the top surface 198.

Providing a riser 190 that has a top surface 198 that extends at an acute angle relative to a bottom surface 199 of the riser has various benefits. For example, some watercraft 10 may have portions of the main body 30 (e.g., portions of the deck 36, the hull 32, or the bow cap 34) that do not extend horizontally. When a base 110 of the mount assembly 100 is coupled to the portions of the main body 30 that do not extend horizontally, a riser 190 that has an angled top surface may be provided to position the base 110 of the mount assembly 100 such that it extends horizontally, which may be beneficial.

Referring now to FIGS. 17, perspective views of a riser 190 are provided, in accordance with an example embodiment. In various examples, a sidewall 194 of the riser 190 has a rhombus or a rhomboid shape to allow the position of the mount assembly 100 to be positioned further in the forward direction F when mounted to the riser 190 than when not mounted to the riser 190. The riser 190 may have a width that is greater than a width of the base 110 of the mount assembly 100. For example, a width of the riser (extending in the lateral direction when coupled to the watercraft 10) may be at least 8 inches and up to 22 inches, such as at least 8 inches and up to 12 inches, whereas a width of the base may be less than 8 inches, such as less than 6 inches. In various examples, a ratio between the width of the riser 190 and the width of the base 110 may be at least 1.5:1, such as at least 1.5:1 and up to 10:1, such as at least 2:1 and up to 8:1, such as at least 3:1 and up to 6:1, such as at least 4:1 and up to 5:1. Providing a riser 190 with a width that is greater than the width of the base 110 of the mount assembly 100 has various benefits. For example, the lateral positioning of the mount assembly 100 may be customized relative to the main body 30 of the watercraft 10. This may be beneficial because it may provide adjustable mounting positions based on user preferences and/or requirements of the watercraft 10 that the mount assembly 100 is coupled to. Also, the width of the riser 190 may be sufficient to span over a trolling motor foot well (not depicted) or other devices, equipment, structure, etc. of the watercraft 10, which may be beneficial.

Referring now to FIGS. 18A-18B, perspective views of a mount assembly 100 are provided, in accordance with an example embodiment. In various examples, the mount assembly 100 includes a plurality of support legs 150. For example, a support leg 150 may be coupled to the elongated extension 120 and at least one support leg 150 may be coupled to the mounting plate 130, such as to a lateral end of the mounting plate 130. In various examples, at least two support legs 150 may be coupled to the mounting plate 130, such as coupled to opposite distal ends of the mounting plate 130. In various examples, the elongated extension 120 does not have a support leg 150 coupled to it and the at least one support leg 150 is instead coupled to the mounting plate 130. Providing a plurality of support legs 150 may provide for increased stability of the mount assembly 100. For example, it may be desired to have a plurality of visual displays 52 coupled to the mount assembly 100. To accommodate the plurality of visual displays 52, the mounting plate 130 of the mount assembly 100 may be relatively large. As such, providing a plurality of support legs 150 may provide extra stability to the mount assembly 100 when the mount assembly 100 is in the second position.

CONCLUSION

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A mount assembly for mounting one or more visual displays of an electronic device on a watercraft, the mount assembly comprising:
   a base configured to be coupled to the watercraft;
   an elongated extension coupled to the base, wherein the elongated extension is configured to pivot relative to the base from a first position to a second position;
   a mounting plate coupled to or monolithic with the elongated extension, wherein the mounting plate is configured to allow the one or more visual displays of the electronic device to be mounted thereto; and
   a locking mechanism that is configured to prevent the elongated extension from moving away from the second position when the elongated extension is in the second position, wherein:
      the locking mechanism is configured to engage a retaining mechanism that is coupled to the watercraft to prevent the elongated extension from moving away from the second position, and
      (1) the locking mechanism is coupled to the elongated extension at a point between the base and the mounting plate or (2) the mount assembly comprises a support leg that is coupled to the elongated extension at a point between the base and the mounting plate and the locking mechanism is coupled to the support leg.

2. The mount assembly of claim 1, further comprising a biasing device configured to bias the elongated extension toward the first position.

3. The mount assembly of claim 2, wherein the biasing device is a gas spring.

4. The mount assembly of claim 1, wherein the mount assembly comprises the support leg that is coupled to the elongated extension and the locking mechanism is coupled to the support leg, and wherein the locking mechanism is a latch.

5. The mount assembly of claim 1, wherein the locking mechanism is coupled to the elongated extension, and the locking mechanism is further configured to disengage with the retaining mechanism while the retaining mechanism is coupled to the watercraft to allow the elongated extension to move away from the second position.

6. The mount assembly of claim 5, wherein the locking mechanism comprises a cup-shaped portion and the retaining mechanism comprises a retaining feature that is configured to be positioned within the cup-shaped portion of the locking mechanism.

7. The mount assembly of claim 1, further comprising a locking mechanism release that is configured to disengage the locking mechanism to allow the elongated extension to move from the second position.

8. The mount assembly of claim 7, wherein the locking mechanism release is positioned at least partially forward of the elongated extension, wherein the forward direction is defined by the watercraft.

9. The mount assembly of claim 1, wherein the mounting plate defines at least one mounting hole for mounting the one or more visual displays of the electronic device.

10. The mount assembly of claim 1, further comprising a riser that is coupled to the base.

11. The mount assembly of claim 10, wherein the riser comprises a box-shaped body and an overhang.

12. The mount assembly of claim 10, wherein the riser comprises a box-shaped body that extends at an angle in a forward direction defined by the watercraft.

13. The mount assembly of claim 1, further comprising:
   a biasing device configured to bias the elongated extension toward the first position;
   a locking mechanism release that is configured to disengage the locking mechanism to allow the elongated extension to move from the second position;
   the support leg that is coupled to the elongated extension, wherein the support leg extends at an angle relative to a longitudinal axis defined by the elongated extension, wherein the angle is at least 0 degrees and up to 120 degrees; and
   a support foot that is coupled to the support leg, wherein the support foot is configured to rest on a main body of the watercraft when the elongated extension is in the second position.

14. The mount assembly of claim 13, wherein:
   the locking mechanism is coupled to the support leg,
   the locking mechanism release is positioned at least partially forward of the elongated extension, and
   the forward direction is defined by the watercraft.

15. The mount assembly of claim 1, wherein the locking mechanism is further configured to disengage with the retaining mechanism while the retaining mechanism is coupled to the watercraft to allow the elongated extension to move away from the second position.

16. A mount assembly for mounting one or more visual displays of an electronic device on a watercraft, the mount assembly comprising:
   a base configured to be coupled to the watercraft;
   an elongated extension coupled to the base, wherein the elongated extension is configured to pivot relative to the base from a first position to a second position;
   a mounting plate coupled to or monolithic with the elongated extension, wherein the mounting plate is configured to allow the one or more visual displays of the electronic device to be mounted thereto; and
   a support leg that is coupled to the elongated extension at a point between the base and the mounting plate, wherein the support leg is configured to support the weight of at least portions of the mount assembly when the elongated extension is in the second position.

17. The mount assembly of claim 16, wherein the support leg extends at an angle relative to a longitudinal axis defined by the elongated extension, wherein the angle is at least 0 degrees and up to 120 degrees.

18. The mount assembly of claim 16, further comprising a locking mechanism that is coupled to the support leg, wherein the locking mechanism is configured to prevent the elongated extension from moving from the second position when the elongated extension is in the second position.

19. The mount assembly of claim 16, further comprising a support foot that is coupled to the support leg, wherein the support foot is configured to rest on the watercraft when the elongated extension is in the second position.

20. A watercraft comprising:
a main body;
an electronic device comprising one or more visual displays; and
a mount assembly comprising:
   a base that is coupled to the main body of the watercraft;
   an elongated extension coupled to the base, wherein the elongated extension is configured to pivot relative to the base from a first position to a second position;
   a mounting plate coupled to or monolithic with the elongated extension, wherein the one or more visual displays of the electronic device is coupled to the mounting plate of the mount assembly; and
   a support leg that is coupled to the elongated extension at a point between the base and the mounting plate, wherein the support leg is configured to support the weight of at least portions of the mount assembly when the elongated extension is in the second position.

* * * * *